United States Patent

[11] 3,625,922

| [72] | Inventors | Satoshi Ando<br>Osaka;<br>Kyoichi Fujimura, Ibaraki, both of Japan |
|---|---|---|
| [21] | Appl. No. | 724,266 |
| [22] | Filed | Apr. 25, 1968 |
| [45] | Patented | Dec. 7, 1971 |
| [73] | Assignees | Kanegafuchi Boseki Kabushiki Kaisha<br>Tokyo, Japan;<br>Snia Viscosa Societa Nazionale Industria Applicazioni Viscosa<br>Milan, Italy |
| [32] | Priorities | May 5, 1967 |
| [33] | | Japan |
| [31] | | 42/28563;<br>July 8, 1967, Japan, No. 42/43891 |

[54] METHOD FOR PREVENTING ELECTRIFICATION OF SYNTHETIC HIGH POLYAMIDES
2 Claims, No Drawings

[52] U.S. Cl. .................................................. 260/78 R,
57/140 R, 260/78 A, 260/78 L, 260/78 S, 260/91.7 R, 260/92.8 A, 260/93.5 A, 260/93.7 R, 260/94.9 GD, 260/DIG. 15, 260/DIG. 19

[51] Int. Cl. .................................................. C08g 20/38
[50] Field of Search ............................................. 260/78 L, 78 P, 78, 78 A, 78 S, 78 SC

[56] References Cited
UNITED STATES PATENTS

| 3,152,094 | 10/1964 | Erner et al. .................. | 260/2.5 |
|---|---|---|---|
| 3,350,364 | 10/1967 | Reimscheussel et al. ...... | 260/78 |

OTHER REFERENCES

Korshak et al.– Synthetic Hetero-Chain Polyamides, 1964, pp. vii, 9, 12, 158, 199, 440

Primary Examiner—Harold D. Anderson
Attorney—Stevens, Davis, Miller & Mosher

ABSTRACT: Synthetic high polymers, such as polyamides, polyolefins, polystyrenes, polyvinyl chloride, polyvinylidene chloride, copolymers thereof and polymer blends thereof can be prevented from electrification by incorporating homogeneously imidazole or its derivatives into said high polymers. The amount of the imidazole or a derivative thereof added is 0.005 to 20 percent by weight based on the amount of the high polymer.

METHOD FOR PREVENTING ELECTRIFICATION OF SYNTHETIC HIGH POLYAMIDES

The present invention relates to a method for preventing electrification of a synthetic high polymer selected from the group consisting of polyamides, polyolefins, polystyrenes, polyvinyl chlorides, polyvinylidene chlorides and copolymers thereof, and polymer blends thereof.

Polyamides are hydrophobic as polyesters, polyolefins and the other synthetic polymers, so that they have a high volume specific resistance and cause a remarkable electrification phenomenon by a slight friction and provide various electrostatic hazards.

Particularly, in production of fibers the electrification phenomenon influences highly on the quality of the fibers and the operation efficiency. For example, in any step of spinning, drawing, twisting, unwinding, warping, knitting, and weaving and also in products, the filaments are stuck to or coiled round materials to be rubbed with the filaments, or the filaments are repelled mutually, so that the unevenness of draft, yarn breakage, fluffy, etc. are formed and therefore normal operation in each step is retarded and further various drawbacks, for example, decrease of quality in products, deterioration of product due to deposited dusts and unpleasant feeling to human body are caused. In order to improve these drawbacks, a large number of proposals have been made.

Namely, methods of applying compounds having antistatic ability to the high polymer, specifically to the polyamides, for example, processes wherein an addition product of an organic sulfamide with an alkylene oxide, an addition product of an organic carboxylic acid alkanolamide with an alkylene oxide, phosphoric acid partial ester of an addition product of an aliphatic alcohol with ethylene oxides or the sodium salts thereof, a composition consisting of water soluble polyglycidyl ether and water soluble amine, a quarternary ammonium compound phosphoric acid ester amine salt (U.S. Pat. No. 2,676,122), a composition consisting of polyamine and polyepoxide U.S. Pat. No. 2,982,751), N-substituted α-amino dicarboxylic acid disaster, an ester of polyethyleneglycol and itaconic acid, or an alkylester of lysine, aspartic acid or glutamic acid is applied on polyamide, in an aqueous solution or emulsion form or then the thus applied polyamide is further subjected to a dry heat treatment to prevent the generation of static electricity.

Furthermore, recently a method for incorporating a compound having antistatic ability in polyamide, namely a method wherein 0.5–1.0 percent by weight of a metal salt of phosphoric acid ester of an aliphatic alcohol or an addition derivative of an aliphatic alcohol with ethylene oxides is mixed with the molten polyamide and the resulting mixture is spun to make the polyamide antistatic, has been proposed.

However, according to such methods for preventing electrification, the antistatic agent is removed by washing with water or cleaning of polyamide shaped articles, so that the antistatic effect is gradually decreased or completely eliminated and therefore, the antistatic effect of these methods are temporarily and further, these methods accompany drawbacks of discoloration of polyamide and worsen the touch.

Furthermore, when these antistatic agents are incorporated in polyamide in melt-extrusion, defects of yarn breakage in melt-spinning, formation of knobs and decrease of strength and elongation due to uniform dispersion of these antistatic agents and further drawbacks of increase of friction resistance and stain due to leaching of the antistatic agents occur, so that these methods for preventing electrification need a further improvement.

In addition, when other high polymers are concerned with, for example, in a process of treatment with alkyl imidazoline derivatives, the effect is decreased as the shaped articles are rubbed and further such agent is readily removed by washing with water and cleaning and the like.

On the contrary, the process, wherein antistatic agent is mixed and dispersed in synthetic high polymers, durability against washing with water, cleaning and the like is higher than the after-treatment process as described above, but this process is not always satisfactory in view of dispersibility, heat stability and discoloration.

The inventors have made many investigations for the purpose of solving the above-described problems and the present invention has been accomplished.

Namely, the object of the present invention is to provide polyamides, polyolefins, polystyrenes, polyvinyl chlorides, polyvinylidene chlorides or copolymers thereof, or polymer blends thereof having an excellent antistatic property.

The other object of the present invention is to provide a method for producing easily the above-described synthetic high polymers or copolymers thereof or polymer blends thereof having an excellent antistatic property.

The above-described objects can be attained by incorporating homogeneously imidazole or its derivatives having the general formula

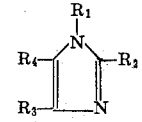

wherein $R_1$, $R_2$, $R_3$ and $R_4$ represent hydrogen, alkyl group, aryl group, aralkyl group, cycloalkyl group, carboxyl group or its metal salt, esterified carboxyl group, alkylcarbonyl group, oxyalkyl group, amino group, acetamide group, alkylamino group, arylamino group or its acetylate or sulfo group and besides $R_2$ may be mercapto group, halogen or halogenated alkyl group and $R_3$ and $R_4$ may be nitro group, aldehyde group, halogen or halogenated alkyl group, into a synthetic high polymer selected from the group consisting of polyamides, polyolefins, polystyrenes, polyvinyl chlorides, polyvinylidene chlorides, and copolymers thereof and polymer blends thereof.

The imidazole or its derivatives to be used in the present invention are those which are durable to the temperature and the pressure in production and melting of the synthetic high polymer irrelative to the substituents, for example, 1-pentyl imidazole, 1-ocytyl imidazole, 1-phenyl imidazole, 1-benzyl imidazole, 1-butyl-2,4,5-trimethyl imidazole, 5-amyl-1-methyl imidazole, 4,5-dipropyl imidazole, 1-ethyl-2-hendecyl imidazole, 1-methyl-2-tetradecyl imidazole, 1-methyl-2-pentadecyl imidazole, 2-phenyl imidazole, 2-decyl imidazole, 2-undecyl imidazole, 2-tridecyl imidazole, 2-tetradecyl imidazole, 2-heptadecyl imidazole, 4,5-diphenyl imidazole, 2,4,5-triphenyl imidazole, 4,5-dicyclohexyl-1-cyclohexyl-methyl imidazole, 2-cyclohexyl imidazole, 1-benzyl-2,4,5-triphenyl imidazole, 2-bromo-4(5)-methyl imidazole, 4,5-dibromo imidazole, 1-butyl-5-chloro-2-propyl imidazole, 1-allyl-4-(3,4 -dichloro-phenyl) imidazole, -benzyl-2-chloromethyl imidazole, 2,4,5-triiodo imidazole, 1-(β-oxyethyl) imidazole, 4(5)-oxymethyl-5(4)-methyl imidazole, 5(4)-(βoxyethyl) imidazole, 2-methyl-4(5)-nitro )-itro imidazole, 4(5)-acetamide imidazole, 5(4)-amino-4(5)-methyl imidazole, 1-(β-aminoethyl) imidazole, 2-(β-aminoethyl) imidazole, 4(5)-aminoethyl imidazole, 4(5)-imidazole aldehyde, 1-methyl imidazole-5-aldehyde, 2-imidazole phenylketone, 5(4)-acetyl-4(5)-methyl imidazole, 4-methyl-1-imidazole carboxylic acid ethyl ester, 2-imidazole carboxylic acid, sodium 4,5-imidazole dicarboxylate, zinc 2-ethyl-4,5 -imidazole dicarboxylate, manganese 4(5)-methyl-5 (4)-imidazole carboxylate, 1-methyl-4-nitro-5-imidazole carboxylic acid, 5-amino-1-methyl-4-imidazole carboxylic acid ethyl ester, magnesium 2-acetamide-4,5-imidazole dicarboxylate, 2-mercapto imidazole, 1-(β-oxyethyl)-2-mercapto imidazole, 2-mercapto-4(5)imidazole carboxylic acid, 4(5)-phenyl-1-imidazole sulfonic acid, 2-imidazole sulfonic acid, 4(5)-imidazole sulfonic acid, 4(5)-methyl-5(4)-imidazole sulfonic acid, etc.

The polyamides to be applied to the method of the present invention include homopolyamides and copolyamides obtained by polycondensation of at least one polyamide-forming compound selected from the group consisting of lactams, ω-aminocarboxylic acids and salts of diamines and dicarboxylic acids, for example, the polyamide-forming materials, such as, γ-butyrolactam, δ-valerolactam, ε-caprolactam, heptolactam, 6-amino caproic acid, 7-aminoheptanoic acid, 9-aminononanoic acid, -aminoudecanoic acid or salts of diamines, such as, tetramethylenediamine, pentamethylenediamine, hexamethylenediamine, heptamethylenediamine, octamethylene diamine, nonamethylenediamine, decamethylenediamine, undecamethylenediamine, dodecamethylenediamine, metaxylylene-diamine, paraxylylenediamine, bis(γ-aminopropyl)ether, N,N'-bis(ω-aminopropyl) piperazine and 1,11-diaminoundecanone-6with dicarboxylic acids, such as, terephthalic acid, isophthalic acid, glutaric acid, adipic acid, pimelic acid, suberic acid, azelaic acid, sebacic acid, dodecandicarboxylic acid, hexahydroterephthalic acid, diphenylene-4,4'-dicarboxylic acid, diphenylmethane-4,4'-dicarboxylic acid, diphenylether-4,4'-dicarboxylic acid and diphenylpropane-4,4'-dicarboxylic acid or salts of diamines and dicarboxylic acid derivatives or salts of diamine derivatives and dicarboxylic acids.

Furthermore, these polyamides may be added with inorganic or organic substances of delustrants, pigments, dyestuffs, light stabilizers, heat resistants and plasticizers.

The polyolefins applicable to the present invention include polyethylene, polypropylene, poly(butene-1), poly (3-methylbutene-1), etc.

An amount of imidazole or its derivatives added to the synthetic high polymer is 0.005 to 20 percent by weight, preferably 0.05–5.0 percent by weight.

When said amount is less than 0.005 percent by weight, the antistatic effect is insufficient, while when said amount is more than 20 percent by weight, impact strength, breaking strength and the like of the shaped articles are decreased, so that such amounts are not preferable. It is desirable to select said amount properly within the above-described range depending upon the kind of the synthetic high polymers, the imidazole derivatives and the conditions in molding.

When the amount of imidazole or its derivatives added is within the above-described range, the strength and elongation, dye receptivity, light stability and the like of the shaped articles are not varied.

Furthermore, the difference of substituent is said imidazole derivatives does not adversely affect on the antistatic effect.

A method for incorporating imidazole or its derivatives in the shaped articles may be effected either by applying imidazole or its derivatives to fine particulates or fine powders of the synthetic high polymers uniformly and then directly melt molding the resulting fine particulates or fine powders, or by melting the mixture of imidazole or its derivative with the synthetic high polymer, molding once the melt into fine particulates or fine powders and then melt molding said fine particulates or fine powders by a conventional process.

When the imidazole or its derivative is added to the polyamides, the addition may be effected either into the starting materials of the polyamide, during the polycondensation reaction, prior to completion of the reaction or into melted polyamide after completion of the polycondensation reaction and in any process, said imidazole or its derivatives can be dispersed and incorporated in the polyamide uniformly.

When a high polymer added with a pigment, dyestuff or delustrant is to be produced, imidazole or its derivative may be solely mixed with the high polymer according to the above-mentioned means, or a mixture of imidazole or its derivative with additives, such as, pigment, dyestuff and delustrant may be added to the polymer or starting materials thereof and dispersed homogeneously therein.

Any of the above-mentioned means for adding imidazole or its derivative to the high polymer does not substantially influence on the remarkable antistatic effect.

Imidazole or its derivatives contained in the synthetic high polymer have an excellent compatibility and retain a uniformly dispersed state and the dispersibility is not decreased under normal molding conditions, such as, melt spinning extrusion molding, injection molding, and compression molding. Furthermore, even if the polymer or the shaped articles containing the imidazole derivative are washed with hot water, the imidazole derivative is not dissolved off.

Thus, the shaped articles of the synthetic high polymer treated with the method of the present invention, show an excellent permanent antistatic effect and do not cause stains due to dust absorbing property or deposition of the antistatic agent and various conventional drawbacks due to the electrification can be avoided in the production of the fiber or other shaped articles, the after-treatment and the practical use.

Accordingly, the synthetic high polymer according to the present invention is preferable for starting materials of production of various clothings, interior ornaments and industrial goods as fiber or other moldings.

The invention will be further explained in detail by the following Examples: The "part" means by weight.

EXAMPLE 1

Into an autoclave 100 parts of ε-caprolactam, 3 parts of water, 0.3 part of titanium oxide, 0.18 part of acetic acid and a predetermined amount of imidazole derivatives were charged and mixed and the atmosphere in the autoclave was substituted for gaseous nitrogen. Then the mixture was heated at 260° C. under a pressure of 1.5 kg./cm.$^2$ (gauge pressure) for 3 hours and succeedingly, at 260° C. under atmospheric pressure for 2 hours to obtain primary polycondensate. Further, the polycondensation reaction was effected at 260° C. under a reduced pressure of 300 mm. Hg for 5 hours and then the resulting polycondensate was extruded in a string form from the bottom of the autoclave under a pressure of 3 kg./cm.$^2$ (gauge pressure) of gaseous nitrogen atmosphere, passed through water bath and quenched and solidified and then the resulting string was cut into fine chips of 3 mm.Φ × 3 mm.

On the other hand, as a control sample fine chips were made under the same condition and in the same process as described above, except that the imidazole derivative was not contained.

The resulting chips were washed with hot water at 80° C. for 20 hours to remove water soluble components and then dried at 80° C. under a reduced pressure of 0.1 mm. Hg to obtain the chips having a water content of 0.067 percent by weight.

The thus-obtained dried fine chips were melt extruded through a nozzle by means of a heat-grid type melt-spinning apparatus after 40 minutes stay in molten state and the resulting undrawn filaments of 251d/18f were wound on a bobbin without applying a spinning oil agent and then the resulting undrawn filaments were left to stand at 20° C. under 65 percent R.H. for 24 hours and cold drawn 3.59 times their original length to obtain the drawn filaments of 70d/18f.

The strength and elongation and voltage of electrification formed due to friction were measured with respect to each drawn filament and the result is shown in the following table 1.

TABLE 1

| Additives | Addition amount percent | Strength (g./d.) | Elongation percent | Voltage of electrification (v.) | |
|---|---|---|---|---|---|
| | | | | Before cleaning | After 10 times cleaning |
| Non addition | | 5.2 | 34.3 | 2,200 | 2,200 |
| 1-benzyl imidazole | 0.003 | 5.3 | 32.7 | 2,050 | 2,000 |
| | 0.005 | 5.2 | 35.0 | 680 | 690 |
| | 0.05 | 5.2 | 31.8 | 58 | 60 |
| | 1.0 | 5.3 | 30.9 | 17 | 17 |

| | 0.003 | 5.0 | 36.2 | 1,970 | 1,950 |
|---|---|---|---|---|---|
| 2-heptadecyl imidazole | 0.005 | 5.2 | 33.4 | 720 | 750 |
| | 0.05 | 5.2 | 32.8 | 43 | 65 |
| | 1.0 | 5.0 | 31.3 | 15 | 12 |
| | 0.003 | 5.3 | 36.3 | 2,150 | 2,150 |
| 4,5-diphenyl imidazole | 0.005 | 5.3 | 32.1 | 700 | 750 |
| | 0.05 | 5.4 | 34.3 | 75 | 80 |
| | 1.0 | 5.2 | 36.4 | 18 | 20 |
| | 0.003 | 5.3 | 32.9 | 2,320 | 2,450 |
| 2-bromo-4-methyl imidazole | 00.05 | 5.1 | 33.0 | 630 | 700 |
| | 0.05 | 5.2 | 31.2 | 70 | 75 |
| | 1.0 | 5.2 | 33.5 | 15 | 28 |
| | 0.003 | 5.4 | 30.7 | 1,800 | 1,950 |
| 4-nitro imidazole | 0.005 | 5.3 | 32.4 | 590 | 720 |
| | 0.05 | 5.1 | 35.1 | 83 | 80 |
| | 1.0 | 5.3 | 34.7 | 20 | 35 |

As seen from table 1, when the amount of the imidazole derivative added is less than 0.005 percent by weight, the antistatic effect is very insufficient, but if said amount is more than 0.005 percent by weight, the favorable antistatic effect can be obtained and particularly, if said amount is more than 0.05 percent by weight, the effect is remarkable and further is not decreased even by cleaning. Furthermore, the content of the additives does not affect the strength and elongation adversely.

EXAMPLE 2

Into a mixture of 90 parts of ε-caprolactam, 10 parts of the salt of hexamethylenediamine with terephthalic acid, 0.18 part of acetic acid and 0.4 part of titanium oxide was added a predetermined amount of different imidazole derivatives as shown in the following table 2, and after stirring and mixing, the resulting mixture was fed into a reaction vessel and heated at 250° C. for 8 hours under atmospheric pressure under gaseous nitrogen atmosphere to effect polycondensation reaction. The resulting polycondensate was extruded in a string form from the bottom of the reaction vessel and passed through a water bath and quenched and solidified and then the solidified string was cut into fine chips of 3 mm.Φ × 3 mm.

As a control sample, fine chips of copolyamide containing no imidazole derivative were manufactured in the same manner and under the same condition as described above.

The resulting two kinds of fine chips were washed with hot water and dried under a reduced pressure in the same manner as described in example 1 to make the water content 0.070 percent by weight, and then the dried fine chips were melt-extruded through a nozzle by means of a heat-grid type melt-spinning apparatus after 40 minutes stay in molten state and were applied with a spinning oil agent by revolving rollers, and the resulting undrawn filaments of 370d/32f were wound on bobbins respectively.

The resulting undrawn filaments were cold-drawn 3.69 times their original length to obtain drawn filaments of 100d/32f, which were woven into taffetas respectively. The taffetas were scoured and dried, and after left to stand for 24 hours at 20° C. under 65 percent R.H., the voltage of electrification formed due to friction was determined.

The determination of voltage of electrification formed due to friction was made as follows:

A taffeta was rubbed with cotton broadcloth having a count of yarn of 40 at a revolution rate of 160 r.p.m. for 30 seconds at 20° C. under 65 percent R.H. and the generated voltage of electrification was determined by means of a rotary static tester (made by Kowa Shokai).

The result is shown in table 2.

TABLE 2

| Additives | Addition amount (percent) | Spinning property | | Yarn property | | Voltage of electrification (v.) |
|---|---|---|---|---|---|---|
| | | Spinnability | Drawability | Strength (g./d.) | Elongation (percent) | |
| Non addition | | Good | Good | 5.0 | 32.5 | 1,800 |
| 1-methyl-2-pentadecyl imidazole | 0.5 | Good | Good | 5.1 | 31.3 | 45 |
| | 5.0 | do | do | 5.0 | 30.8 | 23 |
| | 10 | do | do | 5.0 | 35.1 | 10 |
| | 25 | Yarn breakage occurred. | Yarn breakage occurred. | 4.2 | 33.1 | 10 |
| Zinc 2-ethyl-4,5-imidazole dicarboxylate | 0.5 | Good | Good | 5.2 | 31.1 | 55 |
| | 5.0 | do | do | 5.1 | 30.2 | 20 |
| | 10 | do | do | 5.2 | 34.8 | 12 |
| | 25 | Yarn breakage occurred. | Yarn breakage occurred. | 4.0 | 30.6 | 15 |
| 1-(β-hydroxyethyl)-2-mercaptoimidazole | 0.5 | Good | Good | 5.1 | 34.1 | 65 |
| | 5.0 | do | do | 5.0 | 30.9 | 15 |
| | 10 | do | do | 5.0 | 30.5 | 15 |
| | 25 | Yarn breakage occurred. | Yarn breakage occurred. | 4.3 | 37.1 | 15 |
| 5-phenyl-1-imidazole sulfonic acid | 0.5 | Good | Good | 5.0 | 30.5 | 50 |
| | 5.0 | do | do | 5.1 | 34.5 | 18 |
| | 10 | do | do | 5.3 | 32.0 | 10 |
| | 25 | Yarn breakage occurred. | Yarn breakage occurred. | 4.1 | 35.5 | 10 |

As seen from table 2, the imidazole derivatives have remarkable antistatic effect, but when the amount of the imidazole derivatives added is more than 25 percent by weight, yarn breakage occurs frequently in the spinning and drawing, and unevenness of draft is considerable in the cold-drawing, and there are serious difficulties in the spinnability and drawability.

EXAMPLE 3

Fine chips of polyhexamethyleneadipamide were added with 0.1 percent by weight of imidazole derivatives as shown in the following table 3, and a cubic-type mixer was filled with the resulting mixture and tightly closed and then revolved at a rate of 5 r.p.m. for 2 hours, whereby the imidazole derivatives were applied uniformly on the chips. Then the chips were fed into an extruder and spun and the resulting filaments were applied with a spinning oil agent. Then the resulting undrawn filaments of 260 d/18f were wound on a bobbin.

As a control sample, fine chips of polyhexamethyleneadipamide containing no imidazole derivative were spun in the same manner and under the same condition as described above.

The resulting undrawn filaments were cold-drawn 3.56 times their original length to obtain drawn filaments of 70d/18 f. The drawn filaments were woven into taffeta, which was then scoured and determined with respect to the voltage of electrification in the same manner as described in the example 2. Further, the taffeta after scouring was washed 10 times repeatedly and then the voltage of electrification was determined in the same manner as described above.

The obtained result is shown in Table 3.

TABLE 3

| Additives | Addition amount (percent) | Yarn property | | Voltage of electrification (v.) | |
|---|---|---|---|---|---|
| | | Strength (g./d.) | Elongation (percent) | Before cleaning | After 10 times cleaning |
| Non addition | | 5.8 | 30.5 | 2,300 | 2,300 |
| 1-(β-aminoethyl) imidazole | 0.1 | 5.6 | 35.7 | 55 | 55 |
| 5-acetyl-4-methyl imidazole | 0.1 | 5.8 | 31.2 | 65 | 60 |
| 2-cyclohexyl imidazole | 0.1 | 5.7 | 31.0 | 45 | 45 |
| 2-methyl-4-imidazole carboxylic acid | 0.1 | 5.8 | 32.5 | 60 | 80 |

As seen from table 3, the imidazole derivatives showed an excellent antistatic effect and the effect was not decreased even after the taffeta was washed 10 times. Furthermore, the decrease of the strength and elongation of the drawn filament caused by incorporating imidazole derivatives did not substantially occur.

EXAMPLE 4

To 100 parts of polyethylene resin (Hi-zex 5,000 H, made by Mitsui Sekiyu Kagaku Co.) was added a predetermined amount of imidazole derivatives as shown in the following table 4, stirred and mixed to obtain a homogeneous dispersion, which was extruded from an extruder to obtain a sheet having a thickness of 1 mm. The condition of extrusion was 210° C. (die).

As a control sample, a sheet containing no imidazole derivative was manufactured under the same condition as described above.

Each of the above-mentioned sheets was determined with respect to the surface leakage resistance and the voltage of electrification formed due to friction to obtain a result as shown in table 4.

TABLE 4

| Additive | Added amount (percent) | Surface leakage resistance (Ω) | Voltage of electrification formed due to friction (v.) |
|---|---|---|---|
| None | | 8.5×10$^{17}$ | 6,500 |
| 1-octylimidazole | 0.003 | 2.1×10$^{17}$ | 5,200 |
| | 0.005 | 7.3×10$^{14}$ | 3,200 |
| | 0.05 | 3.8×10$^{10}$ | 570 |
| | 1.0 | 3.5×10$^{9}$ | 180 |
| 2-heptadecylimidazole | 0.003 | 3.3×10$^{17}$ | 5,300 |
| | 0.005 | 8.1×10$^{14}$ | 3,700 |
| | 0.05 | 4.5×10$^{10}$ | 680 |
| | 1.0 | 3.1×10$^{9}$ | 130 |
| 2,4,5-triphenylimidazole | 0.003 | 3.0×10$^{17}$ | 5,000 |
| | 0.005 | 4.5×10$^{14}$ | 3,500 |
| | 0.05 | 4.0×10$^{10}$ | 780 |
| | 1.0 | 2.8×10$^{9}$ | 200 |
| 5-amino-4-methylimidazole | 0.003 | 2.5×10$^{17}$ | 5,800 |
| | 0.005 | 6.0×10$^{14}$ | 4,000 |
| | 0.05 | 4.5×10$^{10}$ | 550 |
| | 1.0 | 3.0×10$^{9}$ | 230 |
| 2-mercapto-4-imidazole carboxylic acid | 0.003 | 2.0×10$^{17}$ | 5,800 |
| | 0.005 | 6.3×10$^{14}$ | 3,800 |
| | 0.05 | 4.7×10$^{10}$ | 600 |
| | 1.0 | 3.0×10$^{9}$ | 150 |

As seen from table 4, when the amount of imidazole derivative added is less than 0.005 percent by weight, the effect for preventing electrification is extremely poor, but when the amount is more than 0.005 percent by weight, the effect is good, and particularly when the amount is more than 0.05 percent by weight, the effect is remarkable.

EXAMPLE 5

To 100 parts of polypropylene resin (Noblen–8040, made by Mitsubishi Yuka Co.) was added a predetermined amount of imidazole derivative as shown in the following table 5, stirred and mixed to obtain a homogeneous dispersion, which was then extruded from an extruder to obtain a sheet having a thickness of 1 mm. The extrusion temperature was 240° C. (die).

As a control sample, a sheet containing no imidazole derivative was manufactured under the same condition as described above.

Each of the above-described sheets was determined with respect to the surface leakage resistance and the voltage of electrification formed due to friction to obtain a result as shown in table 5.

TABLE 5

| Additive | Added amount (percent) | Surface leakage resistance (Ω) | Voltage of electrification formed due to friction (v.) |
|---|---|---|---|
| None | | 8.6×10$^{16}$ | 6,800 |
| 1-phenylimidazole | 0.005 | 7.8×10$^{14}$ | 4,000 |
| | 0.05 | 3.0×10$^{10}$ | 630 |
| | 1.0 | 6.0×10$^{9}$ | 260 |
| 4,5-diphenylimidazole | 0.005 | 6.5×10$^{14}$ | 3,800 |
| | 0.05 | 4.8×10$^{10}$ | 700 |
| | 1.0 | 4.5×10$^{9}$ | 150 |
| 2-methyl-4-nitroimidazole | 0.005 | 8.2×10$^{14}$ | 4,500 |
| | 0.05 | 4.5×10$^{10}$ | 780 |
| | 1.0 | 5.0×10$^{9}$ | 200 |

As seen from table 5, imidazole derivatives have an excellent effect for preventing electrification.

EXAMPLE 6

To 100 parts of polystyrene resin (Styrol–HI–E, made by Denki Kagaku Kogyo Co.) was added and mixed a predetermined amount of imidazole derivatives as shown in the following table 6 to obtain a homogeneous dispersion, which was extruded from an extruder at a temperature of 240° C. to obtain a sheet having a thickness of 1 mm.

As a control sample, a polystyrene sheet containing no imidazole derivatives was manufactured under the same condition as described above.

Each of the above-mentioned sheets was determined with respect to the surface leakage resistance and the voltage of electrification formed due to friction to obtain a result as shown in table 6.

TABLE 6

| Additive | Added amount (percent) | Surface leakage resistance (Ω) | Voltage of electrification formed due to friction (v.) |
|---|---|---|---|
| None | | 7.2×10$^{16}$ | 7,300 |
| 1-octylimidazole | 0.005 | 5.8×10$^{14}$ | 4,300 |
| | 0.05 | 2.3×10$^{10}$ | 450 |
| | 0.5 | 7.9×10$^{9}$ | 220 |
| | 5.0 | 1.6×10$^{9}$ | 80 |
| 2-heptadecylimidazole | 0.005 | 6.3×10$^{14}$ | 3,500 |
| | 0.05 | 3.5×10$^{10}$ | 520 |
| | 0.5 | 6.5×10$^{9}$ | 190 |
| | 5.0 | 2.0×10$^{9}$ | 65 |
| 4,5-diphenylimidazole | 0.005 | 7.1×10$^{14}$ | 3,800 |
| | 0.05 | 3.0×10$^{10}$ | 650 |
| | 0.5 | 5.5×10$^{9}$ | 150 |
| | 5.0 | 1.8×10$^{9}$ | 95 |

As seen from table 6, the imidazole derivatives have a remarkable effect for preventing electrification, and particularly, have an excellent effect in more than 0.05 percent.

EXAMPLE 7

To 100 parts of powdery isotactic polypropylene (number average molecular weight: 52,000) was added a predetermined amount of imidazole derivatives as shown in the following table 7 and fed into a melting apparatus, wherein the imidazole derivative was mixed with and dispersed in the polypropylene homogeneously. Then the dispersion was melted at 270° C. and extruded from nozzle in a string state, quenched and solidified. The solidified string was cut into chips of 3 mm.Φ × 3 mm.

As a control sample, fine chips containing no imidazole derivative were manufactured in the same manner as described above.

Fine chips of each sample were melt spun by means of an extruder to obtain a filament. The resulting filament was determined with respect to the surface leakage resistance and the voltage of electrification formed due to friction to obtain a result as shown in table 7.

shown in table 8.

TABLE 8

| Additive | Added amount (percent) | Surface leakage resistance (Ω) | Voltage of electrification formed due to friction (v.) |
|---|---|---|---|
| None | | $4.3 \times 10^{13}$ | 3,400 |
| 1-phenylimidazole | 0.005 | $2.8 \times 10^{11}$ | 2,200 |
| | 0.05 | $8.5 \times 10^{9}$ | 800 |
| | 1.0 | $2.4 \times 10^{9}$ | 130 |
| 2-undecylimidazole | 0.005 | $2.5 \times 10^{9}$ | 2,500 |
| | 0.05 | $8.0 \times 10^{9}$ | 750 |
| | 1.0 | $3.1 \times 10^{9}$ | 150 |
| 2-methyl-4-imidazole carboxylic acid | 0.005 | $3.0 \times 10^{11}$ | 2,700 |
| | 0.05 | $8.5 \times 10^{9}$ | 800 |
| | 1.0 | $2.8 \times 10^{9}$ | 130 |

TABLE 7

| Additive | Added amount (percent) | Spinnability | Yarn property Strength (g./d.) | Yarn property Elongation (percent) | Surface leakage resistance (Ω) Before washing | Surface leakage resistance (Ω) After washing | Voltage of electrification formed due to friction (v.) Before washing | Voltage of electrification formed due to friction (v.) After washing |
|---|---|---|---|---|---|---|---|---|
| None | | Good | 6.0 | 20.5 | $76.3 \times 10^{12}$ | $76.5 \times 10^{12}$ | 2,900 | 2,850 |
| 2-heptadecylimidazole | 0.5 | Good | 6.1 | 19.0 | $4.7 \times 10^{9}$ | $4.5 \times 10^{9}$ | 55 | 55 |
| | 5.0 | ...do | 6.1 | 19.5 | $1.7 \times 10^{9}$ | $1.6 \times 10^{9}$ | 20 | 20 |
| | 10 | ...do | 5.8 | 18.0 | $1.5 \times 10^{9}$ | $1.5 \times 10^{9}$ | 15 | 15 |
| | 25 | Poor | 4.3 | 12.5 | $1.2 \times 10^{9}$ | $1.2 \times 10^{9}$ | 10 | 10 |
| 2-methyl-4-imidazole carboxylic acid | 0.5 | Good | 5.9 | 17.5 | $5.5 \times 10^{9}$ | $6.0 \times 10^{9}$ | 70 | 65 |
| | 5.0 | ...do | 6.1 | 16.8 | $1.8 \times 10^{9}$ | $1.8 \times 10^{9}$ | 35 | 35 |
| | 10 | ...do | 5.7 | 17.5 | $1.3 \times 10^{9}$ | $1.3 \times 10^{9}$ | 15 | 15 |
| | 25 | Poor | 4.8 | 13.0 | $1.1 \times 10^{9}$ | $1.0 \times 10^{9}$ | 10 | 10 |
| 5-phenyl-1-imidazole sulfonic acid | 0.5 | Good | 6.3 | 18.5 | $5.9 \times 10^{9}$ | $6.0 \times 10^{9}$ | 45 | 50 |
| | 5.0 | ...do | 6.1 | 20.3 | $2.0 \times 10^{9}$ | $2.3 \times 10^{9}$ | 20 | 20 |
| | 10 | ...do | 5.7 | 19.8 | $1.5 \times 10^{9}$ | $1.5 \times 10^{9}$ | 10 | 15 |
| | 25 | Poor | 4.3 | 14.1 | $1.0 \times 10^{9}$ | $1.2 \times 10^{9}$ | 10 | 10 |

As seen from table 7, the imidazole derivatives have a remarkable effect for preventing electrification, but when the added amount is more than 25 percent by weight, there is a serious difficulty in spinnability.

Furthermore, the effect for preventing electrification, the strength and the elongation of the filament obtained by the above-mentioned treatment are not decreased by washing.

EXAMPLE 8

To 100 parts of polyvinyl chloride resin (SS-100, made by Denki Kagaku Kogyo Co.) were added 50 parts of D.O.P., 1.5 parts of cadmium stearate and 0.5 part of barium stearate as plasticizers, and further added a predetermined amount of imidazole derivatives as shown in the following table 8. The resulting mixture was stirred, mixed, further kneaded at 160° C. and then shaped into a sheet having a thickness of 1 mm. by a press at 130° C. under 30 kg./cm.².

As a control sample, a sheet containing no imidazole derivative was manufactured under the same condition as described above.

Each of the above-described sheets was determined with respect to the surface leakage resistance and the voltage of electrification formed due to friction to obtain a result as As seen from table 8, according to the invention, the effect for preventing electrification can be highly increased.

What is claimed is:

1. A composition consisting essentially of a high molecular weight homopolyamide or copolyamide obtained by polycondensing at least one polyamide-forming compound selected from the group consisting of lactams, ω-aminocarboxylic acids, and salts of diamines and dicarboxylic acids and from about 0.005 to about 20 percent by weight based upon said homopolyamide or copolyamide of an imidazole of the formula

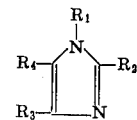

wherein $R_1$ is hydrogen, alkyl, aryl, aralkyl, cycloalkyl, carboxyl or metal salt thereof, alkylcarbonyl, oxyalkyl, aminoalkyl or sulfo;

$R_2$ is mercapto, halogen or a group as defined for $R_1$;

and $R_3$ and $R_4$ are independently nitro or a group as defined for $R_1$.

2. The composition of claim 1, wherein said imidazole constitutes 0.05 to 5.0 percent by weight based upon said homopolyamide or copolyamide.

* * * * *